July 31, 1928.
C. C. FARMER
1,679,024
SIGNAL VALVE DEVICE
Filed Dec. 21, 1926
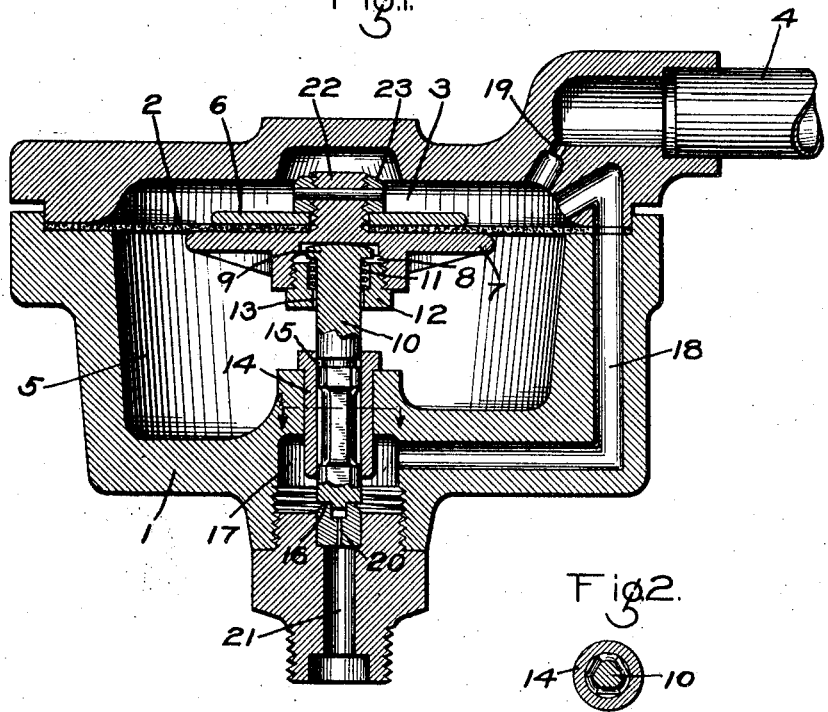
INVENTOR
CLYDE C. FARMER
BY *Wm. M. Cady*
ATTORNEY Patented July 31, 1928.

1,679,024

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SIGNAL-VALVE DEVICE.

Application filed December 21, 1926. Serial No. 156,139.

This invention relates to signal valve devices and more particularly to a signal valve device adapted to be operated by variations in fluid under pressure.

In the usual pneumatically operated signal valve device, a flexible diaphragm, adapted to be operated by fluid under pressure, is employed for operating a valve having a stem rigidly secured to said diaphragm. The valve stem of said valve operates in a closely fitting bushing in the casing of the device. The valve stem being rigidly connected to the diaphragm and having a close fit in the bushing, any uneven distortion of the diaphragm has a tendency to cause the valve stem to bind in the bushing and thus increase the frictional resistance to movement of the valve stem in the bushing, so that the valve stem is liable to stick and cause erratic action of the valve or even failure to operate.

The principal object of my invention is to provide an improved signal valve device in which the above difficulties are overcome.

In the accompanying drawing; Fig. 1 is a cross sectional view of a signal valve device embodying my invention; and Fig. 2 a section on the line 2—2 of Fig. 1.

According to the drawing, the signal valve device may comprise a casing containing a flexible diaphragm 2 forming a chamber 3 at one side, connected to the usual signal pipe 4 and a chamber 5 at the opposite side. Secured axially of the diaphragm 2 at opposite sides are diaphragm plates 6 and 7, having a threaded central extension 22, extending through the diaphragm and engaged by a nut 23, for clamping the plates against the diaphragm.

The clamping plate 7 is provided with a chamber 8 adapted to receive a head 9 of a valve stem 10, said head being yieldingly held in engagement with the clamping plate 7 by a spring 11, which is held in place by a retaining member 12 having screw-threaded engagement in the plate 7.

The surface of the head 9, which engages the clamping plate 7, is made convex, and a clearance space 13 is provided between the retaining member 12 and the valve stem 10.

The valve stem is slidably mounted and closely fits in a bushing 14 secured in the casing 1 and is provided with an annular groove 15 adjacent to the upper end of the bushing. From said groove to the valve seat 16 the valve stem 10 is triangular in cross-section, with the corners rounded off to provide three contact faces engaging the bore of the bushing 14 for guiding purposes, and at the same time the construction provides passageways connecting the annular groove 15 with the chamber 17, said chamber being in communication with diaphragm chamber 3 by way of passage 18.

In operation, the signal pipe 4 being charged with fluid under pressure, fluid is supplied to the diaphragm chamber 3 through the restricted passage 19 and to chamber 17 through passage 18. From chamber 17, fluid leaks around the valve stem 10 into the diaphragm chamber 5. The fluid pressures are thus equalized on the opposite sides of the diaphragm 2 and the valve stem 10 is held with the valve face 16 engaging the valve seat 25.

When the pressure in the signal pipe 4 is reduced and causes a similar reduction in the pressure in diaphragm chamber 3, the pressure in diaphragm chamber 5 then being higher than the pressure in chamber 3, the diaphragm 2 is shifted so as to move the valve stem 10 away from the valve seat 25. This movement causes the groove 15 to be uncovered, so that fluid under pressure can flow from the diaphragm chamber 5 past the valve stem 10 to chamber 17 and thence through the choked passage 20 to passage 21 which is connected to the usual signal whistle (not shown), causing the whistle to operate in the well known manner.

Fluid under pressure flowing from diaphragm chamber 5 to chamber 17 also flows through passage 18 to the diaphragm chamber 3. The pressure in said diaphragm chamber is also increased by flow from the signal pipe 4, as the pressure in said pipe is increased after the reduction. When the pressure of fluid in diaphragm chamber 3 again becomes substantially equal to the pressure in diaphragm chamber 5, the diaphragm 2 is operated to shift the valve stem 10, so that the valve face 16 engages the seat 25. Further flow of fluid under pressure to passage 21 and the signal whistle is thus prevented.

Since the valve stem 10 can move relatively to the diaphragm 2 and the clamping plate 7, there will be no tendency of the valve stem to bind or stick in the bushing 14, as the loose mounting of the valve stem in the clamping plate 7 will permit automatic adjustment between the valve stem and said plate, without causing stress on the valve stem.

Having now described my invention, what I claim as new and desire to secure by Letters Patent, is:—

1. A signal valve device comprising a casing, a flexible diaphragm in said casing, a diaphragm plate carried by said diaphragm and having a chamber, a valve, a valve stem for said valve provided with a head mounted in said chamber, and means for holding said head in said chamber but adapted to permit movement of the head and stem relative to the diaphragm.

2. A signal valve device comprising a casing, a flexible diaphragm in said casing, a diaphragm plate carried by said diaphragm and having a chamber, a valve, a valve stem for said valve provided with a head mounted in said chamber, means for holding said head in said chamber and adapted to permit movement of the head and stem relative to the diaphragm, and means in said casing for guiding said valve stem for axial movement.

3. A signal valve device comprising a casing, a flexible diaphragm mounted in said casing, a diaphragm plate carried by said diaphragm, a valve, a valve stem for said valve, a head carried by said stem and mounted in a chamber in said diaphragm plate, a spring engaging said head, and a member secured to said diaphragm plate for holding said spring in engagement with said head.

4. A signal valve device comprising a casing, a flexible diaphragm mounted in said casing, a diaphragm plate carried by said diaphragm, a valve, a valve stem for said valve, a head carried by said stem and mounted in a chamber in said diaphragm plate, said head having a convex face engaging a surface of said diaphragm plate, and means for holding said head in said chamber.

5. A signal valve device comprising a casing, a flexible diaphragm mounted in said casing, a diaphragm plate carried by said diaphragm, a valve, a valve stem for said valve, a head carried by said stem and mounted in a chamber in said diaphragm plate, said head having a convex face engaging a surface of said diaphragm plate, a spring engaging said head, and means for holding said spring in engagement with said head.

6. A signal valve device comprising a casing, a flexible diaphragm mounted in said casing, a diaphragm plate carried by said diaphragm and having a chamber, a valve, a valve stem for said valve, a head carried by said stem and loosely mounted in said chamber, and a retaining member having screw-threaded engagement in said diaphragm plate, for holding said head in said chamber.

7. A signal valve device comprising a casing, a flexible diaphragm mounted in said casing, a diaphragm plate carried by said diaphragm and having a chamber, a valve, a valve stem for said valve, a head carried by said stem and loosely mounted in said chamber, and a retaining member loosely surrounding said valve stem and having screw-threaded engagement with said diaphragm plate for holding said head in said chamber.

In testimony whereof I have hereunto set by hand.

CLYDE C. FARMER.